May 17, 1949.  E. C. WARRICK ET AL  2,470,667

OIL COOLER

Filed Jan. 10, 1944  2 Sheets-Sheet 1

Inventors
Harold Cruzan
Edward C. Warrick

May 17, 1949. E. C. WARRICK ET AL 2,470,667
OIL COOLER
Filed Jan. 10, 1944 2 Sheets-Sheet 2

Inventors
Harold Cruzan.
Edward C. Warrick.
By C. B. Stevens
Attorney

Patented May 17, 1949

2,470,667

UNITED STATES PATENT OFFICE 2,470,667

OIL COOLER

Edward C. Warrick, Cincinnati, Ohio, and Harold Cruzan, Los Angeles, Calif., assignors to United Aircraft Products, Inc., Dayton, Ohio, a corporation of Ohio Application January 10, 1944, Serial No. 517,720

9 Claims. (Cl. 257—2)

This invention relates to a liquid cooling unit for use in a liquid circulatory system of the type through which a liquid of variable viscosity is circulated under pressure, and has for its general object to provide a liquid cooling unit including a heat exchange portion and novel means to cause the liquid, if it is at or above a certain condition of fluidity or viscosity to flow through said heat-exchange portion for cooling, and to by-pass said heat-exchange portion if it is at or below a certain condition of viscosity or congealation such as might, under an abnormal pressure in the system, cause the cooling unit to be injured or damaged.

One example of a liquid circulatory system, in which is employed a unit for cooling the liquid circulated through the system, is the lubricant circulating system of an internal combustion engine used for powering aircraft. In a system of this type and under the normal operating conditions of the aircraft, cooling of the lubricant is required to maintain the same within a range of temperature and of viscosity for most efficient performance. At times, however, due to the engine of the aircraft remaining idle in a cold atmosphere, or to idling or stopping of the engine during a dive or other period of operation of the aircraft, or to other causes, the lubricant contained in the heat exchange portion of the cooling unit may become more or less congealed, and obstruct flow therethrough.

In that event, bursting of the cooling unit or other injury thereto might result from subjecting the congealed liquid to an abnormally high pressure such as might occur due to suddenly increasing the speed of the engine or to starting of the engine following a period of idlying thereof. Accordingly, under such conditions and in accordance with the instant invention, the lubricant in the system, exclusive of that portion thereof which may be contained in the heat exchange portion of the cooling unit, is circulated through the system in by-passing relationship to the cooling unit.

It is, of course, desirable to re-establish flow of the lubricant through the heat exchange portion of the cooling unit as soon as possible after starting of the engine or upon resumption of normal operation thereof, following any given period of time when the lubricant contained in the heat exchange portion of the cooling unit may have become congealed to such an extent as to obstruct flow of the lubricant therethrough. Therefore, another important object of the invention is to provide a cooling unit embodying a novel construction whereby that portion of the lubricant which is circulated through the system in by-passing relationship to the heat exchange portion of the cooling unit, acts upon the congealed lubricant in the heat exchange portion of the cooling unit to quickly restore its fluidity and thus speedily to re-establish circulation of the lubricant through the heat exchange portion of the cooling unit upon starting of the engine or upon resumption of normal operation thereof, following any given period of time during which the liquid in the heat-exchange portion of the cooling unit may have become congealed.

Another important object of the invention is to provide a cooling unit embodying the features mentioned and which is of simple, sturdy construction and of comparatively low production cost, which may be manufactured with facility and expedition, and which is highly efficient in operation.

With the foregoing and other objects in view, which will become more fully apparent as the nature of the invention is better understood, the same resides in a cooling unit embodying the novel features of construction, combination and arrangement of parts as will be hereinafter more fully described, illustrated in the accompanying drawings and defined in the appended claims.

In the accompanying drawings, wherein like characters of references denote corresponding parts in the different views:

Figure 3 is a transverse section on the line 3—3 of Figure 2;

Figure 4 is a transverse section on the line 4—4 of Figure 2; and

Figure 5 is a sectional view of the valve for controlling flow of liquid through the unit.

Figure 1:
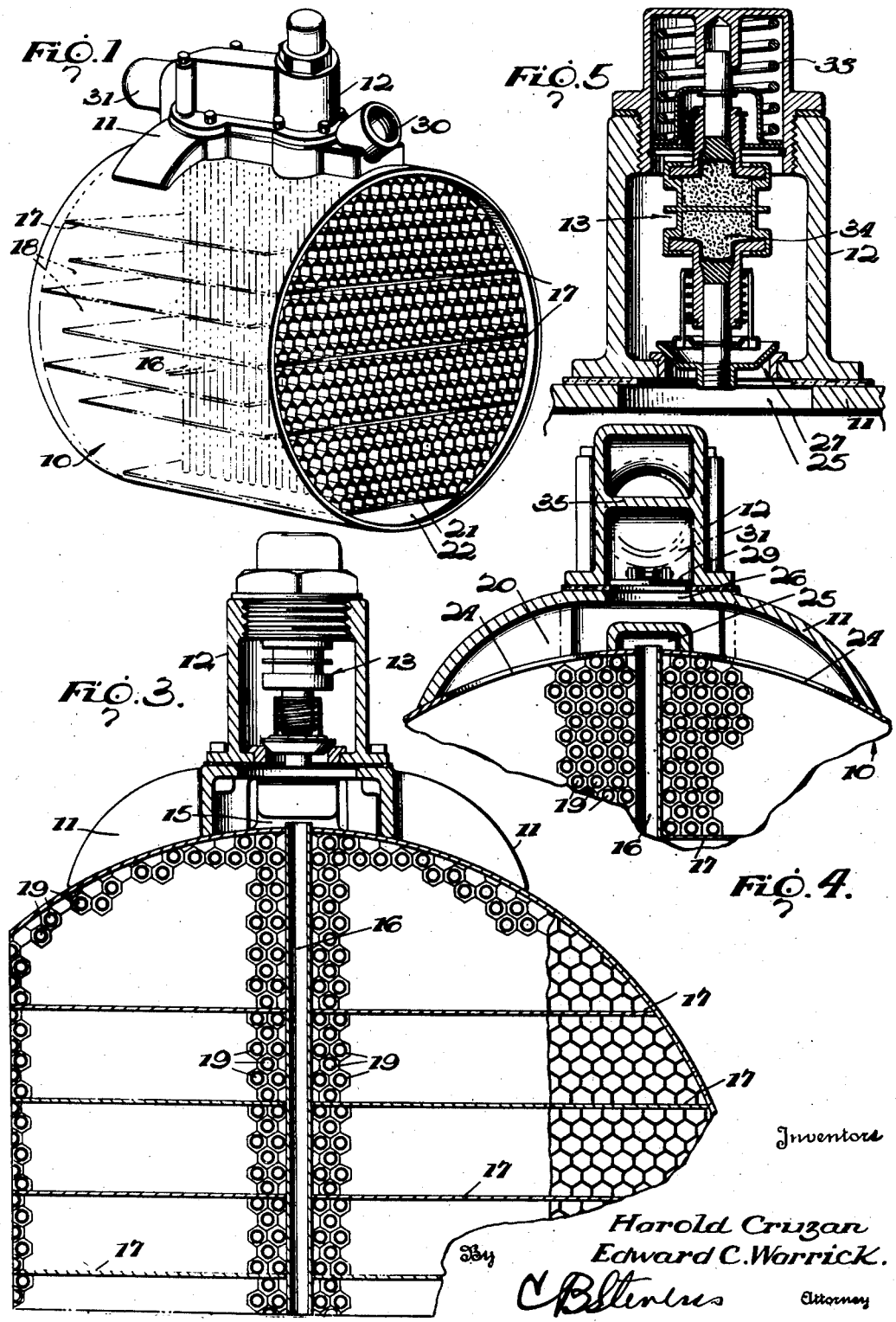
Figure 1 is a perspective view of a cooling unit constructed in accordance with one practical embodiment of the invention.

Referring to the drawings in detail, it will be observed that the present cooling unit, according to the practical embodiment thereof illustrated in the present instance, comprises primarily a casing, designated as 10, housing the heat-exchange portions of the unit; a manifold, designated as 11, secured to the top of said casing 10 exteriorly thereof; a valve housing, designated as 12, superimposed upon the manifold 11 and cooperating therewith to provide passageways for flow of liquid to and from the casing 10 and in by-passing relationship thereto; and a valve, designated generally as 13, mounted in said housing 12 for controlling flow of the liquid either through the casing 10 or in by-passing relationship thereto depending upon the viscosity of the liquid contained in the casing 10.

Preferably the casing 10 is cylindrical in form. It may, however, be of any desired configuration in cross section, and of any desired diameter and length. In any event, it is open at its ends and at its bottom is provided with a passageway 14 which extends substantially throughout the length thereof and which is in communication with a central duct section 15 of the manifold 11 by means of a series of open-ended vertical tubes 16 which are disposed in side-by-side spaced apart relationship in and along the central, vertical, longitudinal plane of the casing. Moreover, a series of vertically spaced horizontally disposed plates 17 extend from side to side of the casing 10 and cooperate with each other and with the casing to provide a single and continuous passageway 18 extending progressively upwardly through the casing from the bottom to the top thereof and also progressively in opposite directions longitudinally from end to end thereof. Furthermore, all available space in the casing 10, and particularly in the passageway 18 to either side of the vertical series of tubes 16, is filled by a honeycomb assemblage of tubes 19 which are open at their ends and which extend longitudinally to the casing in parallel, slightly spaced relationship to each other to divide the passageway 18 into a maze of narrower spaces surrounding said tubes 19, whereby liquid flowing through the casing is divided into small bodies for rapid cooling by air or any other cooling medium flowing through the tubes 19.

At their ends the tubes 19 may be of polygonal shape in cross section and also may be nested and soldered together to close the passageway 18 at the ends of the casing 10; or, alternatively, said passageway 18 may be closed at the ends of the casing in any other suitable manner. In any event, the passageway 18 is in communicating at its lower end with one end of the passageway 14 and at its upper end communicates with a duct section 20 of the manifold 11 that is separate and distinct from the duct section 15 thereof.

According to the construction illustrated in the drawings, the passageway 14 is formed in the bottom of the casing 10 by a horizontal plate 21 spaced a suitable distance above the bottom of the casing and extending from side to side thereof substantially throughout the length thereof, in combination with a pair of closure elements 22 at the ends of said plate between the same and the bottom of the casing. Also, according to the construction illustrated in the drawings, the tubes 16 at their bottoms extend through openings in the plate 21 and thereby are in communication with the passageway 14, and at their tops extend through openings in the top of the casing 10 and thereby are in communication with the duct section 15 of the manifold 11. Likewise, the passageway 18 is in the communication at its lower end with one end of the passageway 14 by means of an opening 23 in the plate 21, and at its upper end is in communication with the duct section 20 of the manifold 11 by means of opening 24 in the top of the casing. Obviously, any equivalent construction may be employed, the specific construction illustrated and just described merely being representative or typical of a number or variety of constructions which may feasibly be employed from a practical and economical manufacturing standpoint.

In the top wall of the manifold 11 are two openings 25 and 26, the former of which constitutes an outlet from the duct section 15 and the latter of which constitutes an outlet from the duct section 20 of the manifold, while in the bottom wall of the valve housing 12 are two other openings 27 and 28, which, in conjunction with the openings 25 and 26, respectively afford communication between the duct sections 15 and 20 of the manifold 11 and the interior of the valve housing 12 under the control of the aforementioned valve 13 and a check valve 29, the former of which is associated with the openings 25, 27 and the latter of which is associated with the openings 26, 28.

The valve 13 may be of any suitable type such that, during normal operation of the system of which the cooling unit is a part, it is yieldably biased toward closing relationship to the openings 25, 27 and is adapted to be opened by an abnormally high pressure of liquid in the duct section 15. On the other hand, the check valve 29 may be of any suitable type to permit flow of liquid through the openings 26 and 28 from the duct section 20 of the interior of the valve housing 12 and to deny flow of liquid from said valve housing 12 to said duct section 20.

The manifold 11 is suitably formed, as indicated at 30, to have connected therewith a conduit for delivering liquid to the duct 15, while the valve housing 12 is suitably formed, as indicated at 31, to have connected therewith a conduit for conducting liquid therefrom.

The valve 13 is closed during normal operation of the system. Therefore, it will be apparent that normally the liquid will flow into the duct section 15, downwardly through the tubes 16 into the passageway 14, from said passageway 14 through the openings 23 in the plate 21 into the lower end of the passage 18, upwardly through the maze of spaces in said passageway 18 between the tubes 19 therein, from the upper end of said passageway 18 through the openings 24 in the top of the casing 10 into the duct section 20 of the manifold 11, through the openings 26, 28 into the valve housing 12, and from said valve housing through the outlet conduit connected therewith.

As long as the liquid remains above a certain temperature and viscosity so that it flows through the heat exchange portion of the cooling unit it will be cooled due to extraction of heat therefrom by air or any other cooling medium flowing through the tubes 19. However, should the liquid in the heat exchange portion of the cooling unit, for any reason, become congealed to an extent to obstruct its flow through said heat exchange portion, pressure in the system thereupon will rise and the valve 13 will be forced open, thus permitting the liquid to flow from the duct section 15 through the openings 25, 27 into the housing 12 in by-passing relationship to the heat exchange portion of the cooling unit. Thus, any harm to the cooling unit in consequence of the liquid becoming congealed in the heat exchange portion thereof is effectively avoided.

Figure 2:
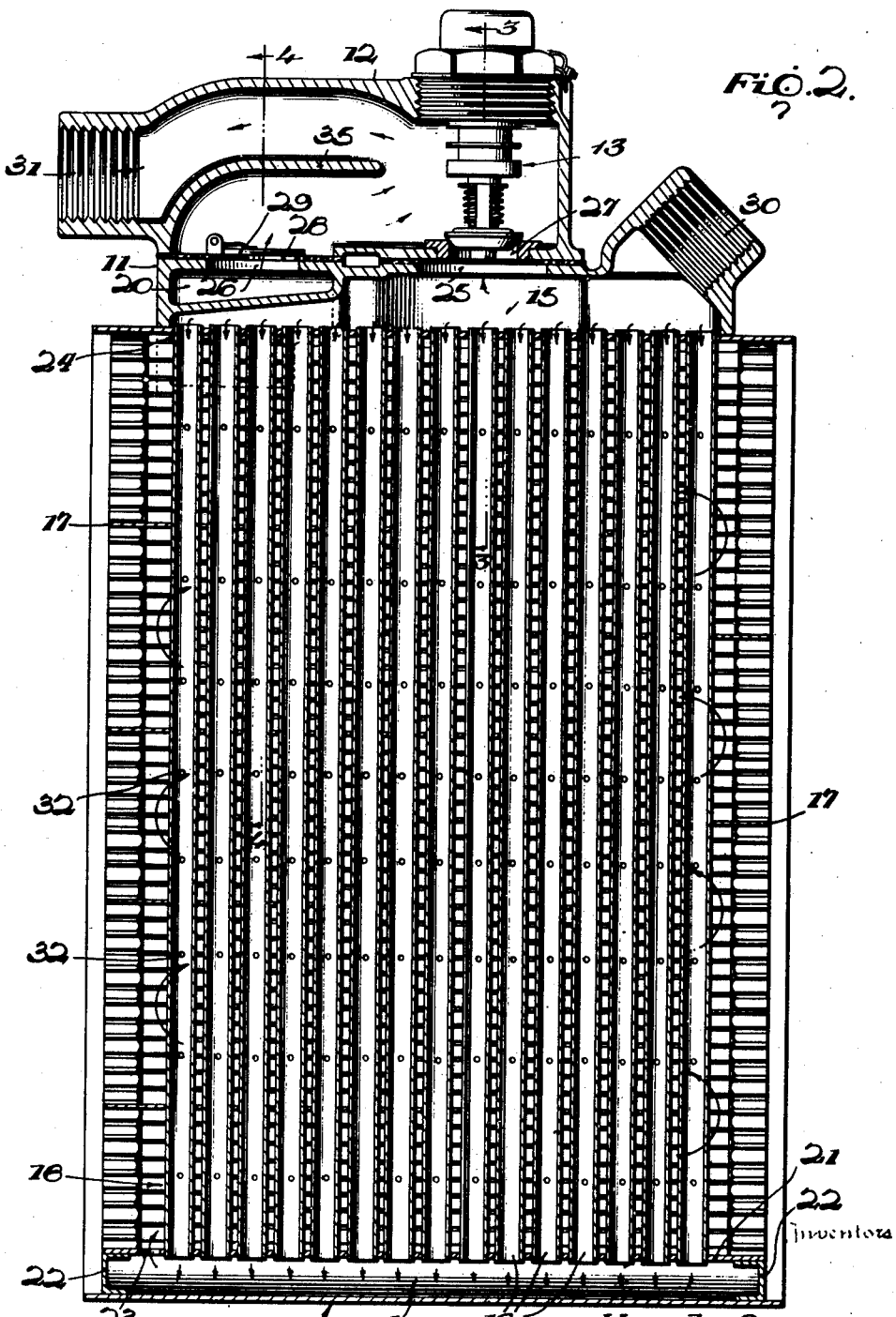
Figure 2 is a central, vertical, longitudinal section through the cooling unit.

The tubes 16 are provided along their lengths with small holes 32 through which small quantities of liquid may flow from said tubes into the passageway 18. However, the amount of liquid which may escape from the tubes 16 through the holes 32 is only a small fraction of the total volume of liquid which flows through said tubes during normal operation of the cooling unit. The fact that it fails to flow completely through the cooling unit due to its short path of travel depending upon the location of the holes 32, is of little or no consequence so far as concerns the efficiency of the unit. In any event, when the liquid in the heat exchange portion of the cooling unit is congealed, the higher temperature liquid being circulated through the system in by-passing relationship to the heat-exchange portion of the cooling unit, acts progressively downwardly through the tubes 16 by heat conduction and pressure to raise the temperature of the congealed liquid in said tubes, and to progressively free said tubes of congealed liquid. As the liquid in the tubes 16 is warmed it escapes through the holes 32 into the passageway 18 and acts to warm and decongeal the congealed liquid in said passageway, thereby far more quickly restoring circulation through the heat exchange portion of the cooling unit than would be the case if the holes 32 were not provided. The number and arrangement or pattern of the openings 32 is determined in part by the size of such openings, as well as by the size and type of oil cooler and by the temperatures in which the cooler is designed to operate. The pattern shown in Fig. 2 is an example of the usually preferred arrangements.

Upon restoration of a condition of fluidity of the liquid in the heat exchange portion of the cooling unit so that it may flow through the unit under the normal pressure in the system, the valve 13 closes and prevents by-passing of the heat exchange portion of the unit and at the same time requires the liquid to pass through the heat exchange portion of the cooling unit to be cooled therein.

Obviously, only a single tube 16, or its equivalent, or any desired number of said tubes or their equivalents, may be employed to conduct liquid from the duct section 15 of the manifold 11 to the passageway 14. Obviously, too, any suitable heat exchange means, other than the means specifically illustrated and described, may be employed within the casing 10 to effect rapid cooling of the liquid flowing through said casing. Moreover, the manifold 11 and the valve housing 12 manifestly may be formed either integrally with or separately from each other and either integrally with or separately from the casing 10.

Preferably the valve 13 is of a type which includes a relief spring 33 and a thermal element 34 for urging the valve closed. Preferably, too, said valve is arranged so that it is closed when said thermal element is subjected to the heat of lubricant circulating through the system and remains slightly open when its thermal element 34 is not subjected to the heat of lubricant in the system. Thus, during any period of idleness of the engine during which the lubricant in the housing 12 cools, the valve 13 opens slightly and remains slightly open so that when the engine is started there is immediate relief through the openings 25, 27 from any surge or other pressure developed in the system as a result of starting of the engine. This is important in protecting the heat-exchange portion of the cooling unit from pressure surges when the engine is started after the lubricant in the system may have become cool, even though there is no obstruction to flow of the lubricant through the heat-exchange portion of the cooling unit, and is particularly important in protecting said heat-exchange portion of the cooling unit from any surging or other pressure developed in the system, in the event the lubricant in said heat-exchange portion may have become congealed.

If there is no obstruction to flow of lubricant through the heat-exchange portion of the cooling unit when the engine is started and the valve 13 is slightly open, the major portion of the lubricant will flow through the heat exchange portion of the unit and but a small portion of the liquid will flow through the openings 25, 27 in by-passing relationship to the heat exchange portion until the thermal element 34 acts to completely close the valve 13, whereupon, all of the liquid will be caused to flow through the heat-exchange portion of the unit. In this connection it will be observed that there is provided in the housing 12 a baffle wall 35 which serves to direct the lubricant, as it enters said housing through the openings 26, 28, toward the valve 13 so that the heat of the lubricant will act on the thermal element 34 to maintain said valve closed.

Of course, when the heat-exchange portion of the unit is obstructed, the spring 33 will permit the assembly comprising the valve 13 and thermal means 34 to rise a greater or lesser amount for by-pass flow of the lubricant, depending upon the pressure of the liquid.

The check valve 29 not only prevent any backflow of lubricant through the heat exchange portion of the cooling unit, but serves to protect said portion of the unit against damaging pressure of the liquid when the tubes 16 are obstructed and the lubricant is flowing into the housing 12 through the openings 25, 27.

Without further description it is believed evident that the construction, operation and advantages of a cooling unit embodying the features of the invention will be clearly understood. It is desired to point out, however, that while only a single specific construction has been illustrated and described, the invention may readily be embodied in specifically different or various types of construction within its spirit and scope as defined in the appended claims.

What is claimed is:

1. A liquid cooling unit for use in a liquid circulating system, said unit comprising a casing, a series of conduits extending transversely across said casing for supplying liquid thereto adjacent to one side thereof, said conduits being spaced longitudinally of the casing and in series extending throughout a major portion of the length of said casing and further being spaced apart for the flow of liquid therebetween exteriorly, means for the supply of liquid to said conduits, means for the outlet of liquid from said casing at a point remote from said side thereof, means for causing liquid flowing through said casing between said conduits and said outlet means to flow substantially throughout that portion of the length of the casing which is occupied by said series of conduits, means for cooling the liquid during its flow through said casing, and means requiring the liquid normally to flow through said conduits and the casing and to effect flow of the liquid between said inlet and said outlet means in by-passing relationship to said conduits and said casing in response to obstruction to flow of the liquid through said conduits and said casing.

2. A liquid cooling unit for use in a liquid circulating system, said unit comprising a casing, a series of conduits extending transversely across said casing for supply of liquid thereto adjacent to one side thereof, said conduits being spaced apart longitudinally of the casing and in series extending throughout a major portion of the length of said casing and further being spaced apart for the flow of liquid therebetween exteriorly, means for the supply of liquid to said conduits, means for the outlet of liquid from said casing at a point remote from said side thereof, means for causing liquid flowing through said casing between said conduits and said outlet means to flow substantially throughout that portion of the length of the casing which is occupied by said series of conduits, means for cooling the liquid during its flow through said casing, and means requiring the liquid normally to flow through said conduits and the casing and to effect flow of the liquid between said inlet and said outlet means in by-passing relationship to said conduits and said casing in response to obstruction to flow of the liquid through said conduits and said casing, said conduits having passages therein spaced along the lengths thereof for delivery of predetermined quantities of liquid from the conduits directly into the casing.

3. A liquid cooling unit for use in a liquid circulating system, said unit comprising a casing, means at one side of said casing defining a passageway extending substantially throughout the length of the casing, means at the opposite side of said casing defining a liquid supply duct substantially co-extensive in length with said passageway, a series of tubes extending transversely across said casing and connecting said duct with said passageway at points spaced along the length thereof, said tubes being spaced apart for the flow of liquid therebetween exteriorly, means defining a tortuous passageway extending through said casing successively in opposite directions substantially from end to end thereof and between said sides thereof, means providing communication between one end of said first-mentioned passageway and one end of said tortuous passageway, means providing a liquid outlet from the casing in communication with the other end of said tortuous passageway, means for cooling liquid flowing through said tortuous passageway, and means normally to flow the liquid from the supply duct through said tubes and said tortuous passageway to said outlet means and to cause the liquid to flow between said supply duct and said outlet means in by-passing relationship to said tubes and said tortuous passageway in response to obstruction to flow of the liquid through said tubes and said tortuous passageways.

4. A liquid cooling unit for use in a liquid circulating system, said unit comprising a casing, means at one side of said casing defining a passageway extending substantially throughout the length of the casing, means at the opposite side of said casing defining a liquid supply duct substantially co-extensive in length with said passageway, a series of tubes extending transversely across said casing and connecting said duct with said passageway at points spaced along the lengths thereof, said tubes being spaced apart for the flow of liquid therebetween exteriorly, means defining a tortuous passageway extending through said casing successively in opposite directions substantially from end to end thereof and between said sides thereof, means providing communication between one end of said first-mentioned passageway and one end of said tortuous passageway, means providing a liquid outlet from the casing in communication with the other end of said tortuous passageway, means for cooling liquid flowing through said tortuous passageway, and means requiring the liquid normally to flow from the supply duct through said tubes and said passageways to said outlet means and to cause the liquid to flow between said supply duct and said outlet means in by-passing relationship to said tubes and said passageways in response to obstruction to flow of the liquid through the tubes and the passageways, said tubes having holes spaced along the lengths thereof for delivery of small quantities of liquid from said tubes directly into said tortuous passageway.

5. An oil temperature regulator of the jacketless type, comprising a casing; an inlet and outlet fitting mounted on said casing; a plurality of tube-like conduits disposed transversely of said casing, one of the ends of said conduits extending into said casing and the opposite ends thereof opening to the exterior of said casing in a position underlying said fitting, said conduits being spaced from each other for the flow of oil therebetween exteriorly and arranged in a longitudinal row; an inlet passage in said fitting communicating with all of said conduits whereby the oil to be conditioned may enter said fitting and be discharged through said conduits into said casing; an outlet from the casing to said fitting; and a controlled by-pass in said fitting connecting said inlet passage and fitting outlet.

6. An oil temperature regulator of the jacketless type, comprising a casing, an assembly of heat exchange tubes in said casing, arranged for the passage of a fluid therethrough as a coolant and for the passage therearound of oil to be cooled, a header chamber at one side of said casing and communicating with the interior thereof, a plurality of conduits extending from outside said casing and into said casing through said assembly of tubes to said header chamber, said conduits being spaced apart so that the oil may flow between them exteriorly, an outlet opening in said casing the oil flowing through said conduits to said header chamber and from said header chamber around tubes of said assembly of heat exchange tubes to said outlet, a fitting mounted on said casing in overlying relation to the outer ends of said conduits and said outlet, first and second chambers in said fitting respectively communicating with said conduits and said outlet, means for admitting oil to be cooled to said first chamber, a port interconnecting said first and second chambers in said fitting, and a tensioned valve controlling flow through said port.

7. An oil temperature regulator according to claim 6 characterized by operating means for said valve including a thermostat interposed in the path of oil flowing through said port and of oil flowing from said outlet.

8. An oil temperature regulator of the jacketless type, comprising a casing, means within said casing defining flow paths for the oil in heat exchange relation with a coolant, a header chamber at one side of said casing and communicating with the interior thereof, said casing having an opening representing the terminus of the flow paths within said casing, a plurality of conduits extending from outside said casing into said casing to said header chamber, said conduits being spaced apart so that the oil may flow between them exteriorly, a fitting mounted on said casing in overlying relation to the outer ends of said conduits and to said opening in said casing, a first chamber in said fitting communicating with the outer ends of said conduits, a second chamber in said fitting communicating with the opening in said casing, means for admitting oil to be cooled to said first chamber, a controlled by-pass in said fitting connecting said first and second chambers, and by-pass ports in said conduits for the discharge of small quantities of oil directly into the flow paths within said casing and in by-passing relation to said header chamber.

9. An oil temperature regulator according to claim 8 characterized in that the controls for said controlled by-pass in said fitting comprise a valve for controlling flow through said by-pass, a thermostat exposed to the temperature of the oil flowing through said port and of the oil leaving the opening in said casing for actuating said valve, and a spring permitting said valve to move yieldingly to open position under pressure irrespective of the temperature of the oil.

EDWARD C. WARRICK.
HAROLD CRUZAN.

REFERENCES CITED

The following references are of record in the file of this patent:

UNITED STATES PATENTS

| Number | Name | Date |
|---|---|---|
| 1,860,731 | Cole | May 31, 1932 |
| 1,992,796 | Young | Feb. 26, 1935 |
| 2,007,590 | Baillio | July 9, 1935 |
| 2,222,496 | Belaieff | Nov. 19, 1940 |
| 2,275,576 | Ware | Mar. 10, 1942 |
| 2,279,285 | Worth | Apr. 7, 1942 |
| 2,288,599 | Ramsaur | July 7, 1942 |
| 2,291,637 | Kohlmann | Aug. 4, 1942 |
| 2,307,300 | Ramsaur | Jan. 5, 1943 |
| 2,322,047 | Mormile | June 15, 1943 |
| 2,343,867 | Hoffman | Mar. 14, 1944 |
| 2,344,207 | Hannon | Mar. 14, 1944 |
| 2,352,704 | Garner | July 4, 1944 |
| 2,406,203 | Cruzan et al. | Aug. 20, 1946 |

FOREIGN PATENTS

| Number | Country | Date |
|---|---|---|
| 460,047 | Great Britain | Jan. 20, 1937 |
| 593,062 | France | May 14, 1925 |